L. R. GRUSS.
AIR SPRING RIGGING.
APPLICATION FILED AUG. 27, 1919.
1,422,566.
Patented July 11, 1922.
2 SHEETS—SHEET 1.
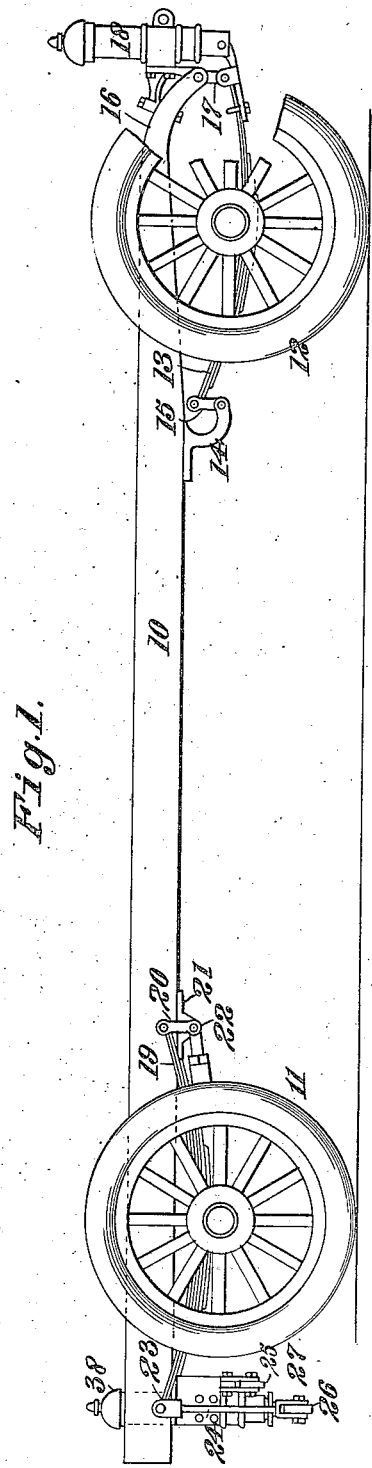
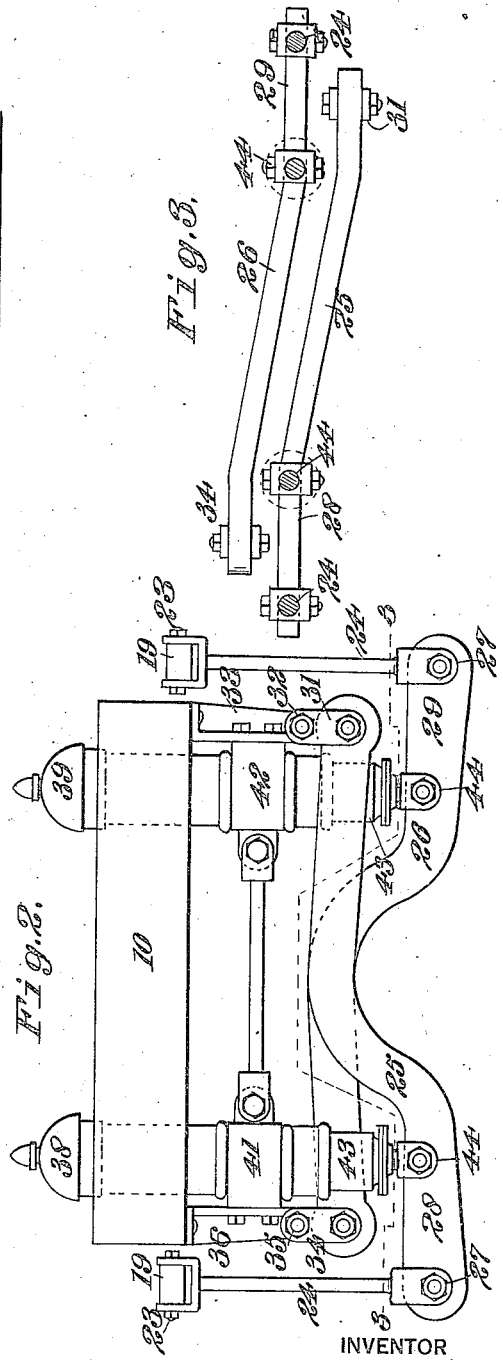
INVENTOR
Lucien R. Gruss
BY
Strong & Townsend
ATTORNEYS

UNITED STATES PATENT OFFICE.

LUCIEN R. GRUSS, OF SAN FRANCISCO, CALIFORNIA, ASSIGNOR TO PNEUMATIC CUSHION CO., OF SAN FRANCISCO, CALIFORNIA, A CORPORATION OF ARIZONA.

AIR-SPRING RIGGING.

1,422,566.           Specification of Letters Patent.       Patented July 11, 1922.

Application filed August 27, 1919. Serial No. 320,229.

*To all whom it may concern:*

Be it known that I, LUCIEN R. GRUSS, a citizen of the United States, residing at the city and county of San Francisco and State of California, have invented new and useful Improvement in Air-Spring Rigging, of which the following is a specification.

The present invention relates to a vehicle, and particularly pertains to a means of yieldably suspending the frame of the vehicle from its running gear.

The principle of the present invention is to provide a frame suspension for vehicles, which embodies the use of air springs for absorbing the shock and rebound of the running gear and also the use of mechanical springs which are so connected with the air springs that they will have a cooperative or combined action therewith to absorb all of the minor and major shocks imparted to the vehicle and also to prevent excessive rebound of the vehicle. Thus, due to the present arrangement, a very desirable frame suspension will be provided to protect the main frame of the vehicle from all of the excessive shock and to insure very desirable riding qualities for the vehicle.

The present invention contemplates the use of air springs similar to those shown in my Patent No. 1,216,254, dated February 13th, 1917, and particularly pertains to a rigging or connection adapting their use to heavy trucks and other vehicles where the usual steel leaf springs and the main body sills on which the air springs are mounted do not come in line.

As is well known these air springs have one element rigidly secured to the main frame, whilst the other element must be yieldably secured to the vehicle springs. The connections between the air springs and the main vehicle spring must be such as to insure proper relative movement of the vehicle springs in relation to the movable element of the air spring.

The invention is illustrated by way of example in the accompanying drawings in which—

Fig. 1 is a view in side elevation, illustrating a vehicle frame suspended upon a suitable running gear and supported thereon by mechanical springs and an air cushion with which the present invention is concerned.

Fig. 2 is a view in rear end elevation, showing the vehicle frame and further disclosing the matter in which the mechanical springs and air-cushion are operatively connected and mounted upon the frame.

Fig. 3 is a view in section and elevation as taken on the line 3—3 of Fig. 2.

Figure 4:
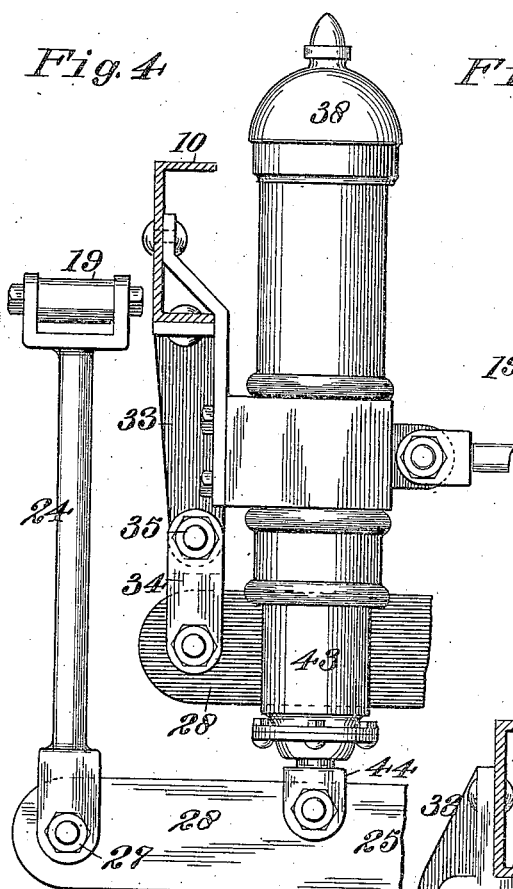
Fig. 4 is an enlarged fragmentary view in elevation showing the air-spring as it appears from the rear of the vehicle and the connections therewith.
Figure 5:
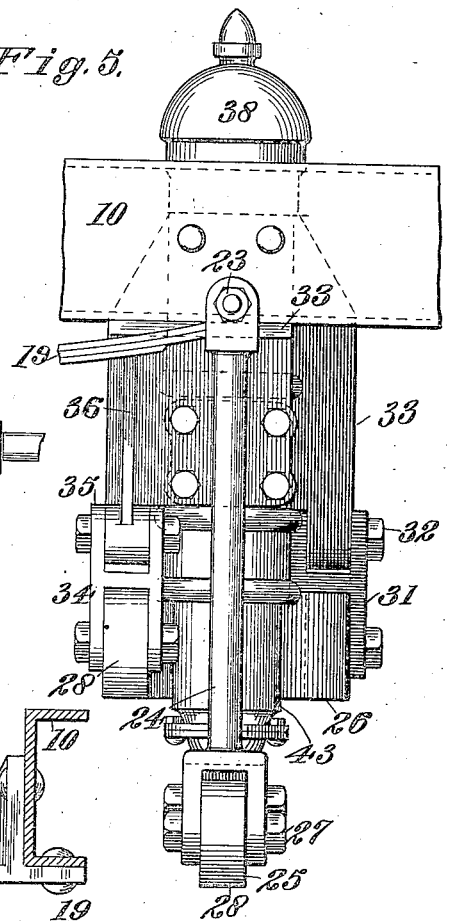
Fig. 5 is an enlarged view showing the part disclosed in Fig. 3, as seen in side elevation.

Referring more particularly to the drawings 10 indicates a main frame, which is supported upon a suitable running gear here indicated at 11 and 12. The forward portion of the running gear is provided with semi-elliptical springs 13 which are secured to the main frame at their rear ends by hanger-bracket 14 and shackles 15. The forward ends of the springs 13 are secured to the horn portion 16 of the main frame by dependent links 17. In Fig. 1 of the drawings the forward ends of the springs are shown to be operatively connected with air-springs 18, the manner of connection being more fully set forth and described in my copending application entitled "Frame suspensions" and filed concurrently herewith.

The present invention is more particularly concerned with the rear springs suspension and it will be noted by reference to Fig. 1 that the rear running gear unit 11 which comprises an axle and wheels at the opposite ends thereof, is mounted in relation to the main frame by means of semi-elliptical springs 19. The forward ends of these springs are provided with shackle plates 20, which depend from the springs and are secured to the main frame by brackets 21 and shackle bolts 22. The axle of the structure is fitted with a spring seat upon which the central portion of the spring is secured, while the rear end of the springs are provided with bolts 23 which engage thrust rods 24. These rods depend from the ends of the springs 19 and as more clearly shown in Figure 2 are pivotally connected by their opposite ends to separate lever beams 25 and 26 by bolts 27.

Referring to Fig. 3 it will be seen that the lever beams 25 and 26 are arranged substantially parallel to each other and have transversely extending portions 28 and 29 which are in longitudinal alignment with each other so that they will accommodate the thrust rods 24 which are parallel to each other upon opposite sides of the main frame. The portions 28 and 29 of the beams are engaged by the thrust rod 24 while the remaining length of each beam is set at an angle to the straight portion and stands parallel thereto until it reaches a point in proximity of the straight portion of the lever beams, at which point it is then to lie parallel thereto. In Fig. 2 it will be noted that the beams 25 and 26 are bent upwardly and then extend horizontally in order to provide clearance. The upper end of the beam 25 is engaged by a shackle 31 which is dependent from the bolt 32 secured to a hanger on the main frame. This hanger, as indicated at 33, is provided for the support of other portions of the frame suspension as will, hereinafter, be set forth. The upper end of the beam 26 is provided with a shackle which is secured by a bolt 35 from a hanger 36. Due to this arrangement of the two shackles it will be seen that they have an over-lapping relation to each other and that when the free end of one beam is moved downwardly, the thrust rod 24 connected therewith will be maintained in a substantially vertically aligned position as permitted by the swinging movement of the supporting shackle.

Figure 6:
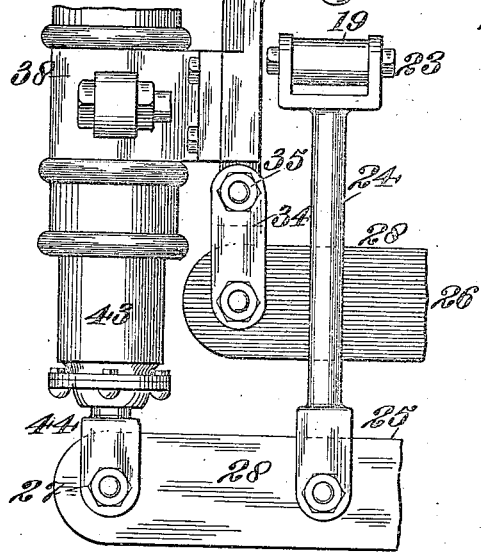
Fig. 6 is an enlarged fragmentary view showing an alternate arrangement of the parts with the air-springs supported upon the outer side of the main frame.

Each of the beams 25 and 26 are in operative connection with an air-spring. The beam 25, being in connection with an air-spring 38, while the beam 26 is in connection with an air-spring 39. The air-springs are of the type previously referred to and are rigidly secured by their fixed casing to the brackets 33 and 36 by means of bosses 41 and 42. In the present instance the bosses are shown as disposed along the inner side of the brackets and thus support the air-cushions 38 and 39 between the parallel side frame members. In Fig. 6 the order is reversed and the air-springs are supported upon the outsides of the members and will thus engage the beams at their outer ends, rather than quite intermediate their ends.

The air-springs are provided with movable members 43 which slide within the casing and are here shown as fitted with connecting links 44. These links are preferably formed with a universal joint at their upper ends to connect them with the piston members 43 and with bifurcated lower ends adapted to straddle the beams 25 and 26 at the inner ends of the straight portions 28 and 29 thereof, thus making it possible for the beams to swing vertically without producing any distortion strains upon the moving and fixed members of the air-cushion.

In operation of the present invention the main frame is supported from the rear axle of the vehicle running gear as indicated in the drawings and during the course of travel of the vehicle any deflection of the springs 19 will be imparted to the piston members 43 through the thrust rod 34. If the deflection is in an upward direction the spring will tend to straighten and as it does the shackles 20 will swing forwardly and the thrust rod 24 will be drawn upwardly. This action will tend to swing the beams 25 and 26. We will assume that there is an unequal displacement and deflection of the springs and that the right hand spring is deflected. This will cause the thrust rod 24 on the right hand side of the vehicle to move upwardly and swing the beam 26 in an upward direction. The swinging action of the beam 26 will take place from the point of suspension upon the opposite side of the frame by means of the shackle and the bolt 25. The upward swinging action of this beam will move the piston member 43 upwardly within the case 39 and thus the shock will be partially absorbed in the right hand spring 19 and in the air-cushion mechanism 39. In the event that there is rebound in the running gear a reverse movement of the thrust rod 24 will take place and the piston 43 will be drawn downwardly against the resistance of the air-cushion. It will also be evident that simultaneous deflection of the springs 19 will produce simultaneous operation of the air-cushion and, therefore, combine the action of two springs and two air-cushions to support the rear end of the vehicle. It will further be noted that any distortion of the main frame and movement from a horizontally aligned position will be resisted and a quickening action produced by the air springs at all times.

As before stated, the chief feature of this invention is the adaptation of the air spring to trucks and other vehicles in which it has heretofore been found difficult to find a proper anchorage for the air spring elements, especially where the body of the vehicle goes inside of the regular steel springs of the vehicle. The present arrangement allows for the suitable suspension of the vehicle body in between the regular steel springs with all the advantages of an air spring hung vehicle.

While I have shown the preferred form of my invention as now known to me, it will be understood that various changes in the combination, construction and arrangement of parts may be made by those skilled in the art without departing from the spirit of the invention as claimed.

Having thus described my invention, what I claim and desire to secure by Letters Patent is:

1. The combination with a frame and axle of a vehicle and a leaf spring interposed between and having one end connected to the frame and extending longitudinally thereof of a telescopic cushion device having one member connected to the frame and carried out of line with the leaf spring and a flexible load carrying connection between the remaining member of the telescopic device and leaf spring, said connection including a transversely arranged lever.

2. The combination with a frame and axle of a vehicle and a leaf spring interposed between and having one end connected to the frame and extending longitudinally thereof of a telescopic cushion device having one member connected to the frame and carried out of line with the leaf spring and a flexible load carrying connection between the remaining member of the telescopic device and leaf spring, said connection including a transversely arranged lever fulcrumed on the vehicle frame and pivotally connected to the cushioning device and a pendent link connection between the lever and leaf spring.

3. The combination with a frame and axle of a vehicle and a pair of load carrying leaf springs between the axle and frame, of a telescopic cushioning device between each spring and the main frame, and connections between each spring and cushioning device including a lever extending transversely of the main frame having one end pivotally connected thereto and the opposite end connected to the spring and connected intermediately to one member of the cushioning device.

In testimony whereof I have hereunto set my hand in the presence of two subscribing witnesses.

LUCIEN R. GRUSS.

Witnesses:
W. W. HEALEY,
M. E. EWING.